United States Patent
Hong et al.

(10) Patent No.: US 9,953,157 B2
(45) Date of Patent: Apr. 24, 2018

(54) METHOD AND APPARATUS FOR PROTECTING APPLICATION PROGRAM

(71) Applicant: Samsung Electronics Co., Ltd., Suwon-si, Gyeongi-do (KR)

(72) Inventors: Jae-Mok Hong, Seoul (KR); Jin-Ho Ko, Hwaseong-si (KR); Tae-Do Bae, Suwon-si (KR); Nam-Geol Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 90 days.

(21) Appl. No.: 14/521,932

(22) Filed: Oct. 23, 2014

(65) Prior Publication Data
US 2015/0113284 A1 Apr. 23, 2015

(30) Foreign Application Priority Data
Oct. 23, 2013 (KR) .................... 10-2013-0126695

(51) Int. Cl.
*G06F 21/51* (2013.01)

(52) U.S. Cl.
CPC ...... *G06F 21/51* (2013.01); *G06F 2221/2123* (2013.01)

(58) Field of Classification Search
CPC ................ G06F 21/51; G06F 2221/2123
USPC .................................... 713/187, 156
See application file for complete search history.

(56) References Cited

U.S. PATENT DOCUMENTS

| | | | | |
|---|---|---|---|---|
| 5,666,412 A * | 9/1997 | Handelman | .......... | G06K 7/0004 235/382 |
| 6,220,510 B1 * | 4/2001 | Everett | .......... | G06K 19/0719 235/379 |
| 7,085,742 B2 * | 8/2006 | Ho | .......... | G06F 21/10 380/46 |
| 7,810,153 B2 * | 10/2010 | Perlin | .......... | G06F 21/31 726/16 |
| 2004/0078568 A1 * | 4/2004 | Pham | .......... | H04L 63/101 713/165 |

(Continued)

FOREIGN PATENT DOCUMENTS

KR 10-1269089 B1 5/2013

OTHER PUBLICATIONS

Bouazzouni, "Trusted mobile computing: An overview of existing solutions", Jun. 8, 2016, Future Generation Computer Systems, pp. 596-612.*

*Primary Examiner* — Taghi Arani
*Assistant Examiner* — Gregory Lane
(74) *Attorney, Agent, or Firm* — Jefferson IP Law, LLP

(57) ABSTRACT

An application creating apparatus generates first authentication information using an authentication element is provided. The apparatus includes an application module when the application module is created, inserts the first authentication information into the application module, and distributes the application module. A user digital device that executes the application module checks the authentication element and the first authentication information included in the application module, generates second authentication information for the authentication element, and determines whether to execute the application module based on a result of comparison between the first authentication information and the second authentication information.

17 Claims, 6 Drawing Sheets

(56) References Cited

U.S. PATENT DOCUMENTS

| | | | | |
|---|---|---|---|---|
| 2005/0177504 | A1* | 8/2005 | Crosson Smith | G06Q 20/10 705/40 |
| 2006/0015723 | A1* | 1/2006 | Lui | G06F 21/125 713/167 |
| 2006/0047958 | A1* | 3/2006 | Morais | G06F 21/51 713/166 |
| 2006/0185017 | A1* | 8/2006 | Challener | G06F 21/565 726/24 |
| 2007/0266382 | A1* | 11/2007 | Webb | G06F 21/51 717/162 |
| 2008/0283595 | A1* | 11/2008 | Kimura | G06F 21/62 235/380 |
| 2011/0179268 | A1* | 7/2011 | Strom | G06F 21/121 713/156 |
| 2011/0296521 | A1* | 12/2011 | Bernabeu | G06Q 20/341 726/19 |
| 2012/0047074 | A1* | 2/2012 | Indenbom | G06F 21/128 705/59 |
| 2012/0054875 | A1* | 3/2012 | Antill | G06F 21/10 726/28 |

* cited by examiner

METHOD AND APPARATUS FOR PROTECTING APPLICATION PROGRAM

CROSS-REFERENCE TO RELATED APPLICATION(S)

This application claims the benefit under 35 U.S.C. § 119(a) of a Korean patent application filed on Oct. 23, 2013 in the Korean Intellectual Property Office and assigned Serial number 10-2013-0126695, the entire disclosure of which is hereby incorporated by reference.

TECHNICAL FIELD

The present disclosure relates to a method and apparatus for protecting data included in an application.

BACKGROUND

Lately, services and additional functions that are provided by an electronic device (e.g., a mobile terminal) are increasing and diversified. In order to raise the effective value of an electronic device and satisfy users' various demands, various applications that are executable in an electronic device are being developed.

An electronic device can store basic applications developed by a manufacturing company of the electronic device and installed in the electronic device, and additional applications downloaded from an application sales website through the Internet, and execute the applications. The additional applications may have been developed by general developers and registered in the application sales website. Anyone who has developed applications can freely sell the applications to a user of the electronic device through the application sales website. Lately, tens of to hundreds of thousands of applications are offered free or for a cost to an electronic device according to the type of the electronic device.

Accordingly, there is a risk of illegal modification and distribution of applications. Particularly, a problem that information included in application source codes is illegally changed by being decompiled may occur. In order to address the problem, application source codes in which classes, functions, and variable names cannot be easily analyzed have been designed. However, there is still a limitation in completely protecting application source codes.

Also, studies into a method for using security mechanisms to prevent applications from being illegally modified and distributed are conducted, however, there is also a limitation in preventing application sources codes from being illegally forged or modified through being decompiled.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and apparatus for securely protecting an application.

In accordance with an aspect of the present disclosure, a method of protecting an application in a digital device is provided. The method includes receiving a request for executing an application module, checking an authentication element and first authentication information included in the application module, the first authentication information signed for the authentication element and included in the application module when the application module is created, generating second authentication information signed for the authentication element, and comparing the first authentication information to the second authentication information to determine whether to execute the application module, based on a result of the comparison.

In accordance with an aspect of the present disclosure, a digital device of protecting an application is provided. The digital device includes a communication unit, a controller configured to download an application module through the communication unit, to execute an authentication agent in response to a request for executing the application module, and to determine whether to execute the application module based on information provided from the authentication agent, and the authentication agent included in the application module, and configured to check first authentication information signed for the authentication element and included in the application module when the application module is created, to generate second authentication information signed for the authentication element, and to provide the result of comparison between the first authentication information and the second authentication information.

In accordance with an aspect of the present disclosure, a method of protecting an application is provided. The method includes generating application data, checking an authentication element included in the application data, generating first authentication information which is authentication information for the authentication element, inserting the first authentication information into the application data to create an application module capable of executing an application, and distributing the application module.

In accordance with an aspect of the present disclosure, an application creating apparatus is provided. The apparatus includes a communication unit, an application creating unit configured to create application data, and an authentication information generator configured to check an authentication element included in the application data, and to generate first authentication information which is authentication information for the authentication element, wherein the application creating unit inserts the first authentication information into the application data to create an application module capable of executing an application, and distributes the application module through the communication unit.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
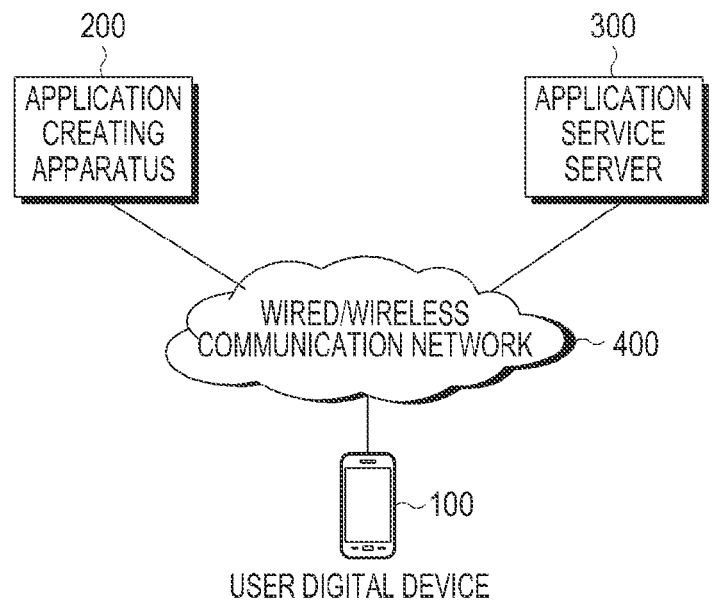
FIG. 1 illustrates an example of a system to which the present disclosure is applied according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The present disclosure relates to a technique for protecting an application, and more particularly, to a technique for preventing an unauthorized digital device or an unauthorized user from illegally modifying an application through decompilation to extract an original application, from extracting content included in an original application, or from illegally using an original application.

In order to implement the technique, an application creating apparatus according to an embodiment of the present disclosure sets at least one of elements included in an application module to an authentication element, and generates authentication information (for example, first authentication information) for the authentication element, when the application module is created. The authentication element is included in the application module for security of the application module, and may include a program area that may be forged or modified. For example, the authentication element may include a read-only data (rodata) area and a text area included in data of an Executable and Linkable Format (ELF). The first authentication information may include Hash values for the rodata area and the text area included in the data of the ELF. The application creating apparatus may distribute the application module including the first authentication information to a user digital device.

The user digital device may execute the distributed application module. In this case, first, the user digital device may extract authentication information (for example, the first authentication information) from the application module. Then, the user digital device may check the authentication element included in the application module, and create authentication information (for example, second authentication information) for the authentication element. Thereafter, the digital device may compare the first authentication information to the second authentication information, and execute the corresponding application if the first authentication information is identical to the second authentication.

A system to which the present disclosure as described above is applied is described below with reference to FIG. 1.

FIG. 1 illustrates an example of a system according to an embodiment the present disclosure is applied.

Referring to FIG. 1, the system may include an application creating apparatus 200, an application service server 300, a user digital device 100, and a wired/wireless communication network 400. The user digital device 100 may be anyone of various electronic devices that can install and execute applications, such as a Personal Computer (PC), a mobile phone, a smart phone, and a tablet PC.

The application creating apparatus 200, which is used to create an application module, may support various Operating System (OS) platforms that are used in the user digital device 100, such as a PC and a mobile terminal. The application creating apparatus 200 may distribute an application module to the user digital device 100. For example, the application creating apparatus 200 may distribute a created application module to the user digital device 100 through the application service server 300.

The application service server 300 may distribute an application module received from the application creating apparatus 200 to the user digital device 100 according to a legal procedure through the wired/wireless communication network 400.

The wired/wireless communication network 400 may be a wired communication network or a wireless communication network. The wireless communication network may include a mobile communication network and the Internet.

As another example, the application creating apparatus 200 may be connected to the user digital device 100 through a predetermined protocol (for example, Universal Serial Bus (USB) communication, serial communication, short-range wireless communication, Wireless-Fidelity (Wi-Fi) communication, etc.) to directly distribute a created application module to the user digital device 100.

In the system as described above, the application creating apparatus 200 may be configured as described below with reference to FIG. 2.

Figure 2:
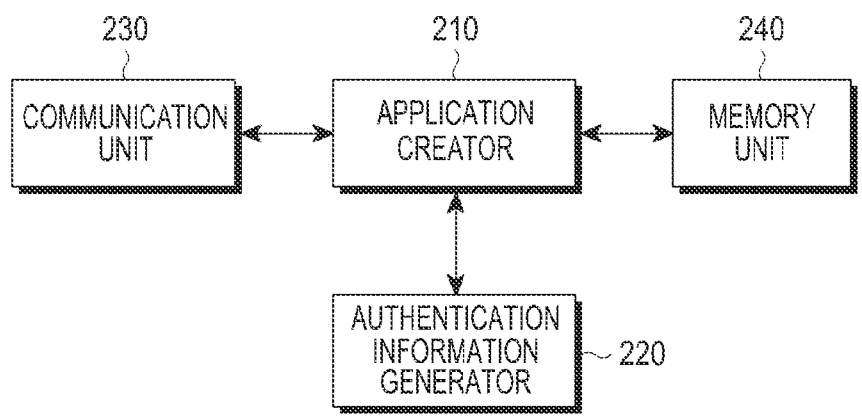
FIG. 2 is a block diagram illustrating a configuration of an application creating apparatus according to an embodiment of the present disclosure.

FIG. 2 is a block diagram illustrating a configuration of the application creating apparatus 200 according to an embodiment of the present disclosure.

Referring to FIG. 2, the application creating apparatus 200 may include an application creator 210, an authentication information generator 220, a communication unit 230, and a memory unit 240.

The communication unit 230 may receive and transmit data from and to an external device under the control of the application creator 210, thereby communicating with the external device.

The memory unit 240 may store control programs for controlling the application creating apparatus 200, and signals/data received from the outside of the application creating apparatus 200. Also, the memory unit 240 may be used as a workspace for operations performed in the application creating apparatus 200.

The application creator 210 may control overall operations of the application creating apparatus 200. In other words, the application creator 210 may control the authentication information generator 220, the communication unit 230, and the memory unit 240. Also, the application creator 210 may create an application module, and interwork with the authentication information generator 220 to create authentication information when an application is created.

The authentication information generator 220 may generate authentication information that is included in the application module, under the control of the application creator 210. More specifically, the authentication information generator 220 may check an authentication element included in application data, and generate authentication information for the authentication element, while the application creator 210 creates the application module. Hereinafter, the authentication information that is generated by the authentication information generator 220 is referred to as first authentication information. For example, the first authentication information may include a Hash value of the authentication element. The application creator 210 may create the application module by inserting the first authentication information into the application data. In addition, the application creator 210 may add an authentication agent execution module to the application module. The authentication agent execution module enables the user digital device 100 (see FIG. 1) to execute an authentication agent. The authentication agent may identify the authentication element included in the corresponding application module, and generate authentication information for the authentication element in the user digital device 100, when the application module is executed in the user digital device 100. The authentication information that is generated by the authentication agent in the user digital device 100 is referred to as second authentication information.

That is, the first authentication information is generated for the authentication element included in the application data, and then inserted into the application module when the application module is created, whereas the second authentication information is generated for the authentication element included in the application module when the application module is executed.

Meanwhile, the application creator 210 may provide the application module to the application service server 300 (see FIG. 1) through the communication unit 230, or may transmit the application module directly to the user digital device 100 through the communication unit 230.

Operations of the application creating apparatus 200 are described below with reference to FIG. 3.

Figure 3:
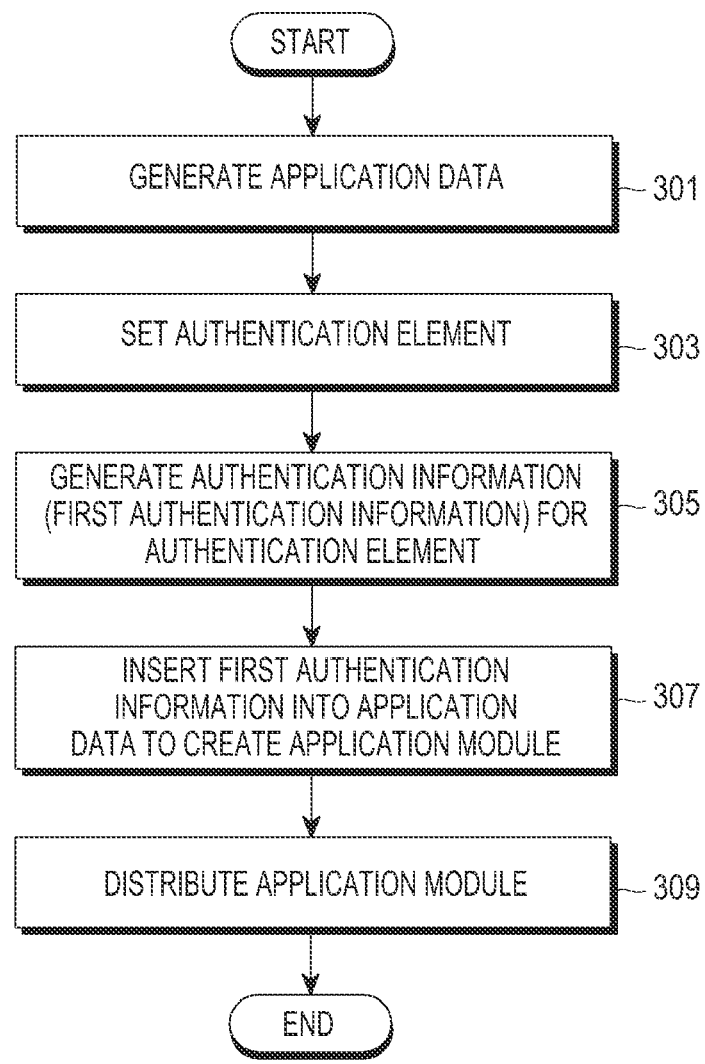
FIG. 3 is a flowchart illustrating an application creating method according to an embodiment of the present disclosure.

FIG. 3 is a flowchart illustrating an application creating method according to an embodiment of the present disclosure.

Referring to FIG. 3, the application creating apparatus 200 may generate application data in operation 301. Then, the application creating apparatus 200 may set an authentication element that is inserted into an application when the application is created, in operation 303. For example, the authentication element may include a text area and a read only data (e.g., rodata) area included in the application data. Thereafter, the application creating apparatus 200 may generate authentication information (e.g., first authentication information) for the authentication element, in operation 305. Then, the application creating apparatus 200 may insert the first authentication information into the application data, and add an authentication agent execution module to the application data including the first authentication information, thereby creating an application module, in operation 307. Thereafter, the application creating apparatus 200 may distribute the application module, in operation 309.

According to another embodiment of the present disclosure, in operation 307, the application creating apparatus 200 may insert the application data including the first authentication information into an application module, without adding an authentication agent execution module to the application data.

Figure 4:
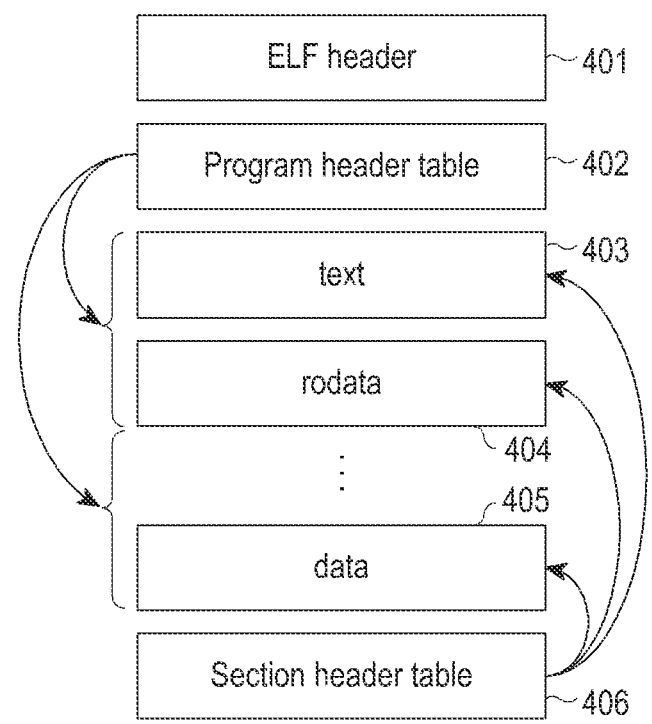
FIG. 4 illustrates a structure of application data to which an application creating method is applied according to an embodiment of the present disclosure.

FIG. 4 illustrates a structure of application data to which the application creating method is applied according to an embodiment of the present disclosure.

The application data illustrated in FIG. 4 has a data structure of an ELF. The ELF is a common standard of a file format for execution files, object codes, shared libraries, and core dump. The ELF is used as a standard binary file format for x86-based Unix and Unix-like system. Since the ELF includes a flexible, extendable design, the ELF is dependent on neither specific processors nor specific architectures, and can be applied to various kinds of different platforms.

The ELF is a format for storing programs or fragment programs stored in a disk, and created from the results of compiling and linking. A data structure of the ELF may be divided into at least two areas. An execution file may include a text area in which codes are stored, a data area in which global variables are stored, a rodata area including string constants, and a header area representing how to describe areas that need to be stored in a memory.

Referring to FIG. 4, application data, that is, data of the ELF may include an ELF header area 401, a program header table area 402, a text area 403, a rodata area 404, a data area 405, and a section header table area 406.

The areas included in the application data may store data as described in Table 1 below.

TABLE 1

| Name of Area | Attributes of Area |
|---|---|
| bss | bss is a section including non-initialized data, and contributes to creating a memory image of a program. According to a definition, the system initializes data to 0 when a program is executed. Since bss occupies no space of a file, bss has a section type of SHT_NOBITS. |
| comment | comment is a section including version control information. |
| data/data1 | data/data1 is a section including initialized data, and contributes to creating a memory image of a program. |
| debug | debug is a section including information for debugging symbols, and the content of the section is not specified. |
| dynamic | dynamic is a section including dynamic linking information. The attributes of the section will have a SHF_ALLOC bit. Setting a SHF_WRITE bit is dependent on a processor. |
| dynstr | dynstr is a section including strings needed for dynamic linking. A string representing a name related to an entry of a symbol table is most general. |
| dynsym | dynsym is a section including a dynamic linking symbol table. |
| fini | fini is a section including executable commands that contribute to exit a process. That is, when a program quits normally, the system will get ready to execute the codes of the section. |

TABLE 1-continued

| Name of Area | Attributes of Area |
|---|---|
| got | got is a section including a global offset table. |
| init | init is a section including executable commands that contribute to initialize a process. That is, when a program starts being executed, the system will get ready to execute the codes of the section before calling an entry point of a main program. |
| interp | interp is a section including a path name of an interpreter of a program. If a file has a stackable segment, and the segment has the section, the attributes of the section will include a SHF_ALLOC bit, and otherwise, the bit will be off. |
| .line | line is a section including line information for symbol debugging. The section describes common parts between machine language codes and a program source. The content of the section was not specified. |
| .note | .note is a section including information in a "Note Section" format. |
| .plt | .plt is a section including a link table of a procedure. |
| .relname/ .relname | .relname/.relaname is a section including realignment information. If a file has a stackable segment, and the segment includes the attributes of the section, a SHF_ALLOC bit will be set. Otherwise, the bit will be off. Generally, name will be provided by a section to which realignment is applied. For example, a realignment section for .text has a name of .rel.text or .rela.text. |
| rodata and .rodata1 | rodata and .rodata1 is a section including rodata, and contributes to creating a segment image disallowing writing of a process. |
| shstrtab | shstrtab is a section including the names of sections. |
| symtab | symtab is a section including the same symbol table as a "Symbol Table" in the section describes. If a file is a stackable segment, and the segment includes a symbol table, the attributes of the section will include a SHF_ALLOC bit. Otherwise, the bit will be off. |
| text | text is a section including "text", and contains executable commands of a program. |

At least one area of the areas may be set to an authentication element, and particularly, since there is a high possibility that the text area and the rodata area are forged or modified, the text area and the rodata area may be set to an authentication element.

Further, the areas included in the application data are not limited to those described in Table 1. In other words, the areas included in the application data may vary depending on a data structure of the corresponding application or depending on the OS of an apparatus in which the application is installed and executed.

Figure 5:
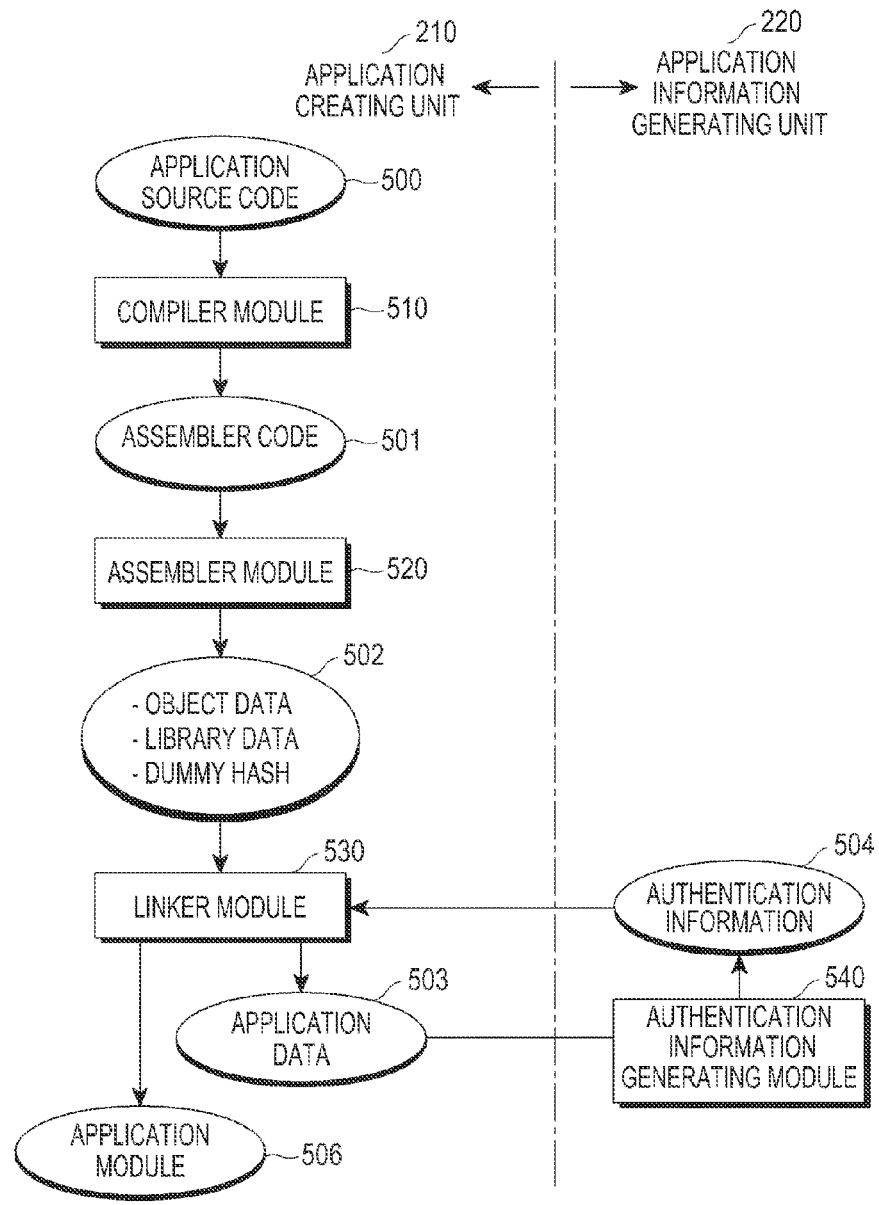
FIG. 5 illustrates data that is generated by an application creating method according to an embodiment of the present disclosure.

FIG. 5 illustrates data that is generated by an application creating method according to an embodiment of the present disclosure.

Referring to FIG. 5, program modules that process the application creating method, and data that is generated by the program modules are shown. The program modules may be included in the application creator 210 and the authentication information generator 220 (see FIG. 2). That is, the application creator 210 may include a compiler module 510, an assembler module 520, and a linker module 530, and the authentication information generator 220 may include an authentication information generating module 540.

For example, an application source code 500 may be a source code file programmed with a language such as C or C++. The application source code 500 may be data input by a user or created by the application creator 210 based on information designed by a user.

The application source code 500 may be input to the compiler module 510, and the compiler module 510 may convert the application source code 500 into an assembler code 501. The assembler module 520 may convert the assembler code 501 to create an object file, library file, and dummy hash value 502. Specifically, the assembler module 520 may generate temporary authentication information (for example, a Dummy Hash value) obtained by processing a Hash value to be used for authentication as a dummy value. The linker module 530 may generate application data (for example, execution file data based on the ELF) 503 including the object file, the library file, and the temporary authentication information.

Operation of generating the application data 503 may correspond to operation 301 of FIG. 3.

Meanwhile, the application data 503 may be provided to the authentication information generating module 540 of the authentication information generator 220. The authentication information generating module 540 may check information included in the application data 503 to an authentication element. Specifically, the authentication information generating module 540 may check an authentication element defined in the application data 503. For example, the authentication element may be defined in the header area of the application source code 500. The authentication element may be set to a text area and a rodata area. The authentication information generating module 540 may generate authentication information 504 for the text area and the rodata area. The authentication information 504 may include a Hash value for the authentication element, that is, for the text area and the rodata area. The authentication information generating module 540 may provide the authentication information 504 to the linker module 530 of the application creator 210.

An operation in which the authentication information generating module 540 sets the authentication element may correspond to operation 303 of FIG. 3. An operation of generating the authentication information 504 for the authentication element may correspond to operation 305 of FIG. 3.

Also, an operation in which the authentication information generating module 540 provides the authentication information 504 to the linker module 530 may further include an operation of replacing the temporary authentication information (for example, the Dummy Hash value) provided from the assembler module 520 with the authentication information 504. An operation of replacing the temporary authentication information (for example, the Dummy Hash value) with the authentication information 504 may correspond to operation 307 of FIG. 3.

Then, the linker module 530 may combine the object file and the library file provided from the assembler module 520 with the authentication information 504 provided from the authentication information generating module 540 to create an application module (for example, execution file data based on the ELF) 506.

As such, an operation of creating an application module (for example, execution file data based on the ELF) may correspond to operation 309 of FIG. 3.

Figure 6:
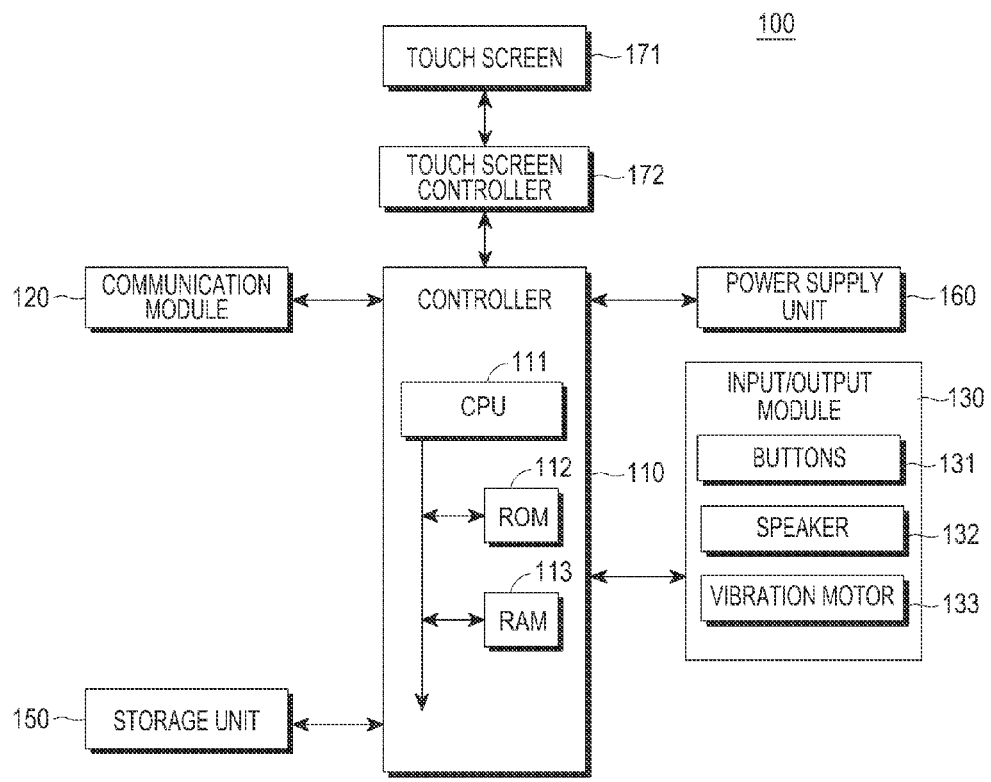
FIG. 6 is a block diagram illustrating a configuration of a digital device according to an embodiment of the present disclosure.

FIG. 6 is a block diagram illustrating the digital device 100 according to an embodiment of the present disclosure.

Referring to FIG. 6, the digital device 100 may include a controller 110, a communication module 120, an input/output module 130, a storage unit 150, a power supply unit 160, a touch screen 171, and a touch screen controller 172.

The controller 110 may include a Central Processing Unit (CPU) 111, Read Only Memory (ROM) 112 that stores control programs for controlling the digital device 100, and Random Access Memory (RAM) 113 that temporarily stores signals/data received from the outside of the digital device 100 or is used as a workspace for operations performed in the digital device 100. The CPU 111, the ROM 112, and the RAM 113 may be connected to each other through internal buses. Also, the controller 110 may control the communication module 120, the input/output module 130, the storage unit 150, the power supply unit 160, the touch screen 171, and the touch screen controller 172. The controller 110 may be configured with a single-core, or with a multi-core, such as a dual-core, a triple-core, or a quad-core. The controller 110 may be configured with a predetermined number of cores by one of ordinary skill in the art according to the properties of the digital device 100.

The communication module 120 may include at least one of a cellular module, a Wireless Local Area Network (WLAN) module, and a short-range communication module.

The cellular module enables the digital device 100 to connect to an external device through mobile communication using at least one antenna (not shown), under the control of the controller 110. The cellular module may transmit/receive radio signals for voice calls, video calls, Short Message Service (SMS) messages, or Multimedia Messaging Service (MMS) messages to/from a mobile phone (not shown), a smart phone (not shown), a tablet PC (not shown), or another device (not shown), a phone number of each of which is entered or registered in the digital device 100.

The WLAN module may connect to the Internet at a place in which a Wireless Access Point (AP) is installed, under the control of the controller 110. The WLAN module supports IEEE802.11x. The WLAN module may drive a Wi-Fi Positioning System (WPS) that acquires position information of the digital device 100 based on position information provided from a WAP connected wirelessly.

The short-range communication module may perform wireless short-range communication between terminals, under the control of the controller 110. The short-range communication module may perform communication based on short-range communication, such as Bluetooth, Infrared Data Association (IrDA), WiFi-Direct communication, and Near Field Communication (NFC).

Further, the communication module 120 may perform data communication with another electronic device connected through a USB communication cable or a serial communication cable, based on a predetermined communication method (for example, USB communication or serial communication).

The input/output module 130 may include at least one of one or more buttons 131, a speaker 132, and a vibration motor 133.

The buttons 131 may be provided in the front, side, and/or rear part of the housing of the digital device 100. The buttons 131 may include at least one of a power/lock button (not shown), volume buttons (not shown), a menu button (not shown), a home button (not shown), a back button (not shown), and a search button (not shown).

The speaker 132 may output sound corresponding to various signals (for example, radio signals and broadcasting signals) from the cellular module, the WLAN module, and the short-range communication module, to the outside of the digital device 100, under the control of the controller 110. The speaker 132 may be provided as at least one unit at an appropriate location (or locations) on the housing of the digital device 100.

The vibration motor 133 may convert electrical signals into mechanical vibration, under the control of the controller 110. The vibration motor 133 may be provided as at least one unit in the housing of the digital device 100.

The speaker 132 and the vibration motor 133 may operate according to a setting of a volume operating mode of the digital device 100. For example, the digital device 100 may be set to one of volume operating modes of a sound mode, a vibration mode, a sound & vibration mode, and a silent mode. The controller 110 may output a signal to control operation of the speaker 132 or the vibration motor 133 according to a function that is performed by the digital device 100, based on the set volume operating mode.

The storage unit 150 may store signals or data that is input/output according to operations of the input/output module 130 and the touch screen 171, under the control of the controller 110. The storage unit 150 may store control programs and applications for controlling the digital device 100 or the controller 110.

In this description, the term a "storage unit" includes the storage unit 150, the ROM 112 or RAM 113 included in the controller 110, and a memory card (not shown, for example, a Secure Digital (SD) card or a memory stick) installed in the digital device 100. The storage unit 150 may be a non-volatile memory, a volatile memory, a Hard Disk Drive (HDD), or a Solid State Drive (SSD).

Also, the storage unit 150 may store a downloaded application module.

The power supply unit 160 may supply power to at least one battery (not shown) included in the housing of the digital device 100, under the control of the controller 110. The battery may supply power to the digital device 100. Also, the power supply unit 160 may supply power received from an external power source (not shown) through a wired cable connected to a connector of the digital device 100, to the digital device 100. Also, the power supply unit 160 may supply power received wirelessly from an external power source (not shown) through wireless charging, to the digital device 100.

The touch screen 171 may provide a user with User Interfaces (UIs) corresponding to various services (for example, a call, data transmission, broadcasting, and photographing), based on OS of the digital device 100. The touch screen 171 may output an analog signal corresponding to at least one touch input inputted to a UI to the touch screen controller 172. The touch screen 171 may receive at least one touch input through a user's body part (for example, a user's finger including a thumb) or a pointing unit (for example, a stylus pen). Also, the touch screen 171 may receive a touch-and-drag input. In this case, the touch screen 171 may transmit an analog signal corresponding to the touch-and-drag input to the touch screen controller 172.

The touch screen 171 may be a resistive touch screen, a capacitive touch screen, an infrared touch screen, or an acoustic wave touch screen.

Meanwhile, the touch screen controller 172 may control output values of the touch screen 171 so that display data provided from the controller 110 can be displayed on the touch screen 171. Also, the touch screen controller 172 may convert analog signals received from the touch screen 171 into digital signals (for example, X and Y coordinates), and transfer the digital signals to the controller 110.

The controller 110 may process a user input using data provided from the touch screen 171 and the touch screen controller 172. That is, the controller 110 may control the touch screen 171 using digital signals received from the touch screen controller 172. For example, the controller 110 may select a shortcut icon (not shown) displayed on the touch screen 171 or execute the shortcut icon, in response to a touch event or a hovering event.

The methods according to the embodiments as described above may be implemented in the form of program instructions that can be executed using various types of computer means, and may be stored on a computer-readable medium. The computer-readable medium may include program instructions, data files, data structures, etc. independently or in combination. The program instructions stored on the medium may be designed especially for the present disclosure or may also be known to and be used by those skilled in the art of computer software.

Also, the methods according to the embodiments may be implemented in the form of program instructions and stored in the storage unit 150 of the digital device 100. The program instructions may be temporarily stored in the RAM 113 included in the controller 110 in order to execute the methods. Accordingly, the controller 110 may control hardware components included in the digital device 100, in response to the program instructions for executing the methods, temporarily or permanently store data generated when the methods are executed, in the storage unit 150, and provide the touch screen controller 172 with UIs needed for executing the methods.

In addition, the digital device 100 may further include an authentication agent (not shown). The authentication agent may be included in the controller 110, or provided as an independent module in the digital device 100.

The authentication agent may authenticate an application. The controller 110 may download an application module from the application service server 300 (see FIG. 1) through the communication module 120 (see FIG. 6), in response to a request from a user, and install the downloaded application module in the digital device 100. The application module may include an authentication agent execution module. When the downloaded application module is executed in the digital device 100, the controller 110 may execute the authentication agent using the authentication agent execution module included in the application module.

The authentication agent may extract an authentication element included in the application module at an appropriate time, and create an authentication signature (second authentication information). Then, the authentication agent may extract an authentication signature (first authentication information) from the application module, determine whether the first authentication information is identical to the second authentication information, and enable the application to be executed if the first authentication information is identical to the second authentication information.

An operation in which the authentication agent authenticates an application module may be performed at any time while the application module is executed. For example, the authentication agent may authenticate an application module when the application module starts being executed.

Also, the authentication agent may enable the controller 110 to authenticate an application module when authentication is required while a stage of the application module is performed. For example, when an application module starts being executed, and predetermined content included in the application module, to which a security technique was applied, is reproduced, the application module may be authenticated.

Figure 7:
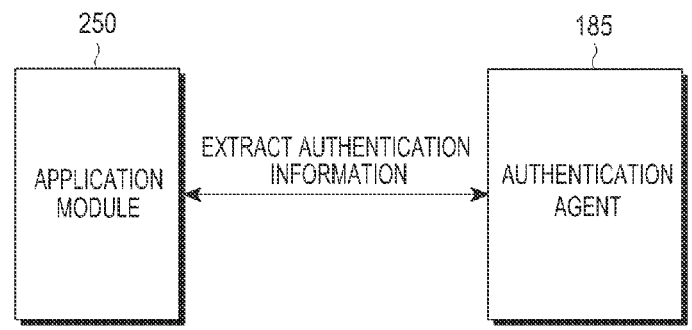
FIG. 7 is a block diagram illustrating a configuration of an application processing apparatus included in a digital device according to an embodiment of the present disclosure.

FIG. 7 is a block diagram illustrating a configuration of an application processing apparatus included in the digital device 100 according to an embodiment of the present disclosure.

Referring to FIG. 7, the application processing apparatus may include an application module 250 and an authentication agent 185. The application processing apparatus may be included in the controller 110 (see FIG. 6).

The application processing apparatus may start operating in response to an application module execution request from a user. More specifically, if an application module execution request is received, the application module 250 may be executed, and the authentication agent 185 may be installed.

The authentication agent 185 may extract an authentication element from the application module 250 to create an authentication signature (e.g., second authentication information). Then, the authentication agent 185 may extract an authentication signature (e.g., first authentication information) included in the application module 250 when the application module is created, and compare the first authentication information to the second authentication information.

Then, the authentication agent 185 may provide a value instructing whether to execute the corresponding application module 250, based on a results of the comparison between the first authentication information and the second authentication information. For example, if the authentication agent 185 determines that the first authentication information is identical to the second authentication information, the authentication agent 185 may provide a value instructing execution of the application module 250, to the application module 250. In contrast, if the authentication agent 185 determines that the first authentication information is not identical to the second authentication information, the authentication agent 185 may provide a value disallowing execution of the application module 250, to the application module 250, and display a message notifying that the application module 250 cannot be executed, or generate alarm sound notifying that the application module 250 cannot be executed.

The operation of the digital device 100 will be described in more detail in an application processing method which will be described below.

Figure 8:
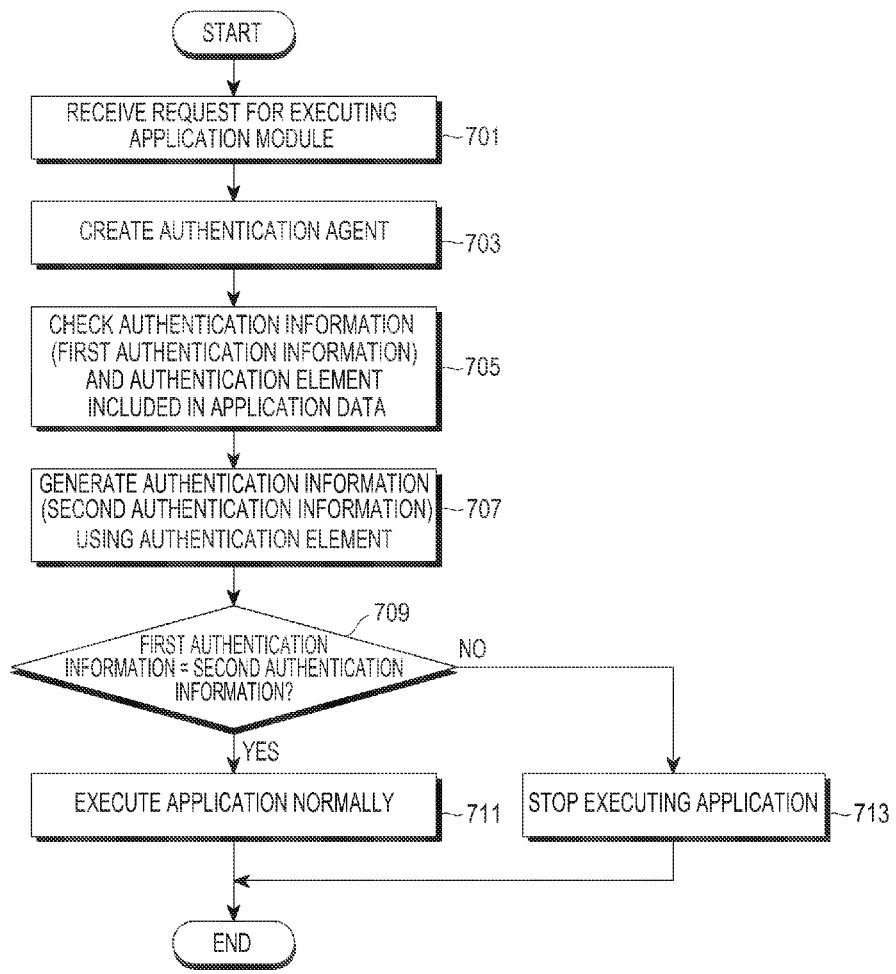
FIG. 8 is a flowchart illustrating an application processing method according to an embodiment of the present disclosure.

FIG. 8 is a flowchart illustrating an application processing method according to an embodiment of the present disclosure.

Referring to FIGS. 1, 5 and 8, in operation 701, the controller 110 of the digital device 100 may receive a request for executing a predetermined application module 250 through the input/output unit 130 or the touch screen 171. Accordingly, the controller 110 may access the predetermined application module 250 to execute the predetermined application module 250.

For example, the predetermined application module 250 may have been stored in another electronic device (for example, a server) connected to the digital device 100 through a predetermined communication network, or in the storage unit 150 of the digital device 100. Accordingly, the controller 110 may connect to the other electronic device through the communication module 120 to access the predetermined application module 250 stored in the other electronic device, or may access the predetermined application module 250 stored in the storage unit 150 of the digital device 100.

Then, in operation 703, the controller 110 may create and execute an authentication agent 185 (see FIG. 7).

In operation 705, the authentication agent 185 may check information included in the predetermined application module 250 to extract first authentication information. The first authentication information may have been inserted into the predetermined application module 250 when the predetermined application module 250 is created, and the first authentication information may include signature information (for example, a Hash value) for an authentication element included in the predetermined application module 250. Also, in operation 705, the authentication agent 185 may check the authentication element defined when the predetermined application module 250 is created. The authentication element may be defined in a header (for example, an ELF header) of the predetermined application module 250, and the signature information for the authentication element may be included in an area in which the authentication element is stored. Accordingly, the authentication agent 185 may perform an operation of creating the predetermined application module 250, in the other way, to thus extract an application source code, detect the header (for example, an ELF header) of the predetermined application module 250 from the application source code, check the authentication element defined in the header, and acquire the signature information (for example, a Hash value, that is, the first authentication information) for the authentication element from an area in which the authentication element is stored.

In operation 707, the authentication agent 185 may generate authentication information (second authentication information) for the authentication element. That is, the authentication agent 185 may compile the application source code extracted in operation 705, and generate authentication information (for example, a Hash value, that is, second authentication information) for the authentication element. An operation of generating the second authentication information may correspond to an operation of generating the first authentication information 504 in the application creating method as described above with reference to FIG. 5.

Then, in operation 709, the authentication agent 185 may compare the first authentication information to the second authentication information to determine whether the first authentication information is identical to the second authentication information.

If the predetermined application module 250 has never been illegally modified, the authentication element is not modified, and the first authentication information inserted by the application creating apparatus 200 will be identical to the second authentication information generated by the authentication agent 185. However, if the predetermined application module 250 has been illegally modified, the first authentication information inserted by the application creating apparatus 200 will be not identical to the second authentication information generated by the authentication agent 185.

Therefore, if the authentication agent 185 determines in operation 709 that the first authentication information is identical to the second authentication information, the authentication agent 185 may notify the predetermined application module 250 of successful authentication so that the predetermined application can be normally executed in operation 711. If the authentication agent 185 determines in operation 709 that the first authentication information is not identical to the second authentication information, the authentication agent 185 may notify the predetermined application module 250 of authentication failed so that the predetermined application is no longer executed in operation 713. In addition, notification informing that execution of the predetermined application has been stopped, and a reason why execution of the predetermined application has been stopped may be displayed on the touch screen 171.

As described above, the present disclosure provides a method and apparatus for securely protecting an application. Also, the present disclosure may prevent illegal forgery due to decompiling of an application.

Furthermore, by detecting forgery or modification with respect to correction of program to control operations of an application, malicious forgery or modification may be prevented.

In addition, since an execution file and a library themselves verify integrity without changing the formats of the execution file and the library, the present disclosure may be applied to the creation of various application files without correcting kernels.

Since a Hash value that is used as authentication information is included in an application, the Hash value is instead provided as separate data such as an external file, and authentication information is not exposed to the outside. Also, by logically including authentication information (for example, a Hash value) in an application to conceal the authentication information, security may be enhanced.

It will be appreciated that embodiments of the present disclosure can be realized in the form of hardware, software, or a combination of hardware and software. Any such software may be stored in non-volatile storage such as, for example, a storage device like a ROM, whether erasable or rewritable in memory such as, for example, RAM, memory chips, device or integrated circuits, or in an optically or magnetically writable, machine (e.g., a computer)-readable medium such as, for example, a Compact Disk (CD), Digital Versatile Disk (DVD), magnetic disk or magnetic tape or the like. The methods according to the embodiments of the present disclosure may be implemented by a computer or an electronic device including a controller and a memory. The memory is an example of a machine-readable storage medium suitable to store a program or programs including instructions for implementing embodiments of the present disclosure. Accordingly, the methods according to the embodiments of the present disclosure include a program comprising code for implementing an apparatus or a method as claimed in any one of the claims of this specification and a non-transitory machine-readable storage storing such a program. Still further, such programs may be conveyed electronically via any medium such as a communication signal carried over a wired or wireless connection and embodiments suitably encompass the same.

The computer or the electronic device may receive and store the program from a program providing apparatus connected in a wired/wireless fashion thereto. The program providing apparatus may include a program including instructions to perform a predetermined content protection method, a memory for storing information needed for performing the content protection method, a communication unit for wired/wireless communication, and a controller for controlling transmission of the program. The program providing apparatus may provide, when receiving a program providing request from the computer or the electronic device, the program to the computer or the electronic device in a wired/wireless fashion. Also, even when no program providing request is received from the computer or the electronic device, the program providing apparatus may provide, for example, if the computer or the electronic device is located in a predetermined place, the program to the computer or the electronic device in a wired/wireless fashion.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for protecting an application by an electronic device, the method comprising:
receiving an application module including application data of the application, wherein the application data includes a first authentication information;
receiving a request for executing the application module;
identifying the first authentication information from the application data, wherein the first authentication information is inserted into the application data when the application module is generated;
in response to the request for executing the application, generating, in the electronic device, second authentication information using an authentication element included in the application data, at least one region of the application data being set as the authentication element; and
executing the application in response to the request if the first authentication information is identical to the second authentication information,
wherein the authentication element includes an area that stores read-only data among the information included in the application module.

2. The method of claim 1, wherein the determining of whether to execute the application module comprises stopping executing the application module if the first authentication information is not identical to the second authentication information.

3. The method of claim 1, further comprising executing an authentication agent included in the application module, in response to the request for executing the application module.

4. The method of claim 1, wherein the first authentication information includes information signed for the authentication element when the application module is created.

5. The method of claim 1, wherein the authentication element includes an area that stores an executable command of the application module among information included in the application module.

6. An electronic device for protecting an application, the electronic device comprising:
a communication module; and
at least one controller configured to:
control the communication module to receive an application module including application data of the application from an external electronic device, wherein the application data includes a first authentication information,
identify the first authentication information from the application data,
in response to the request for executing the application, generate, in the electronic device, second authentication information using an authentication element included in the application data, at least one region of the application data being set as the authentication element, and
execute the application in response to the request if the first authentication information is identical to the second authentication information,
wherein the authentication element includes an area that stores read-only data among the information included in the application module.

7. The electronic device of claim 6, wherein the controller stops executing the application module if the first authentication information is not identical to the second authentication information.

8. The electronic device of claim 6, wherein the first authentication information includes information signed for the authentication element when the application module is created.

9. The electronic device of claim 6, wherein the authentication element includes an area that stores an executable command of the application module among information included in the application module.

10. A method for protecting an application by an electronic device, the method comprising:
generating application data of the application;
setting an authentication element corresponding to at least one data region of regions included in the application data;
generating first authentication information for the at least one data region using the set authentication element, the generated first authentication information being inserted into the application data when an application module is generated;
generating the application module including the application data, the application data including the generated first authentication information; and
transmitting the generated application module to at least one external electronic device for executing the application module,
wherein the authentication element is used to generate second authentication information which is compared to the first authentication information for determining whether the application module is executed before the application is executed by the at least one external electronic device, and
wherein the authentication element includes an area that stores read-only data among the information included in the application module.

11. The method of claim 10, wherein the application module includes an authentication agent configured to authenticate the application data using the first authentication information and the authentication element, in the at least one external device for executing the application module.

12. The method of claim 10, wherein the application data includes temporary authentication information that is temporarily generated before the authentication element is authenticated.

13. The method of claim 12, wherein the creating of the application module comprises replacing the temporary authentication information with the first authentication information.

14. The method of claim 10, wherein the authentication element includes an area that stores an executable command of the application module among the information included in the application module.

15. An electronic device for protecting an application, comprising:
a communication module;
at least one controller configured to:
generate application data of the application,
set an authentication element corresponding to at least one data region of regions included in the application data,
generate first authentication information for the at least one data region using the set authentication element, the generated first authentication information being inserted into the application data when an application module is generated, generate the application module including the application data, wherein the application data includes the generated first authentication information, and control the communication interface to transmit the generated application module to the external electronic device for executing the application module, wherein the authentication element is used to generate second authentication information which is compared to the first authentication information for determining whether the application module is executed before the application is executed by the at least one external electronic device, and wherein the authentication element includes an area that stores read-only data among the information included in the application module.

16. The electronic device of claim 15, wherein the application module includes an authentication agent configured to authenticate the application data using the first authentication information and the authentication element, in the external electronic device for executing the application module.

17. The electronic device of claim 15, wherein the application data includes temporary authentication information that is temporarily generated before the authentication element is authenticated, and wherein the controller is further configured to replace the temporary authentication information with the first authentication information.

* * * * *